Nov. 5, 1963     C. F. PERVIER     3,109,441

VIBRATION RESPONSIVE TRIP VALVE ASSEMBLY

Filed June 20, 1960

INVENTOR.
CHARLES FRANK PERVIER
BY
*Bruce & Brosler*

HIS ATTORNEYS

United States Patent Office 3,109,441
Patented Nov. 5, 1963

3,109,441
VIBRATION RESPONSIVE TRIP VALVE ASSEMBLY
Charles Frank Pervier, Oakland, Calif., assignor to Amot
Controls Corporation, a corporation of California
Filed June 20, 1960, Ser. No. 37,515
5 Claims. (Cl. 137—46)

My invention relates to valves and more particularly to a vibration responsive trip valve assembly.

Among the objects of my invention are:

(1) To provide a novel and improved trip device adapted to respond to vibration to which it may be exposed and exercise a control function;

(2) To provide a novel and improved vibration responsive trip valve assembly;

(3) To provide a novel and improved vibration responsive trip valve assembly, the sensitivity of which may be altered;

(4) To provide a novel and improved vibration responsive trip valve assembly which is equally sensitive to vibration in more than one plane;

(5) To provide a novel and improved vibration responsive trip valve assembly capable of being readily reset following tripping;

(6) To provide a novel and improved vibration responsive trip valve assembly which may be reset automatically; and (7) To provide a novel and improved vibration responsive trip valve assembly which may be restained from tripping when desired.

Additional objects of my invention will be brought out in the following description of a preferred embodiment of the same in the form of a vibration responsive trip valve assembly, taken in conjunction with the accompanying drawings, wherein.

Figure 1:
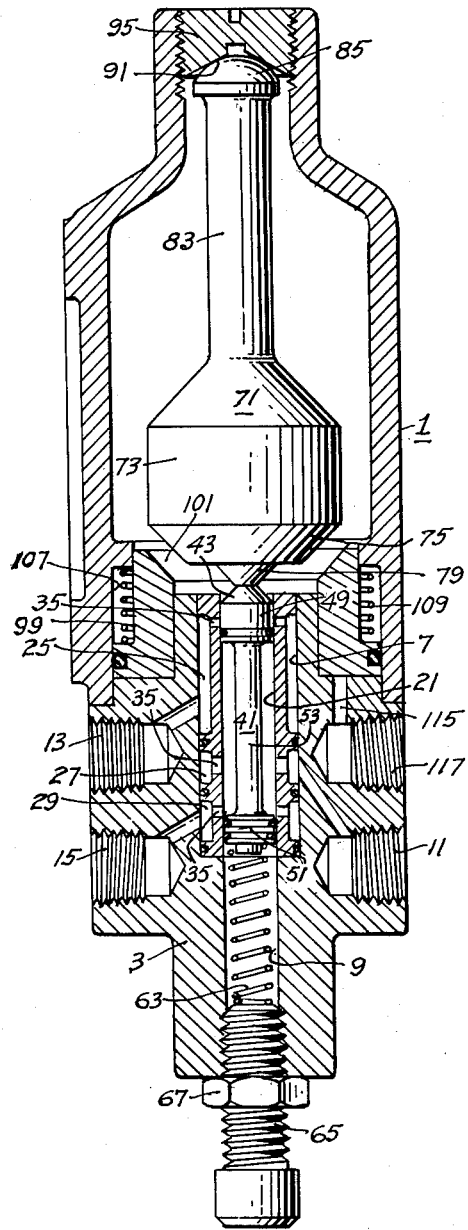
FIG. 1 is a view in section of such vibration responsive trip valve assembly, illustrating the valve assembly in its set condition.
Figure 2:
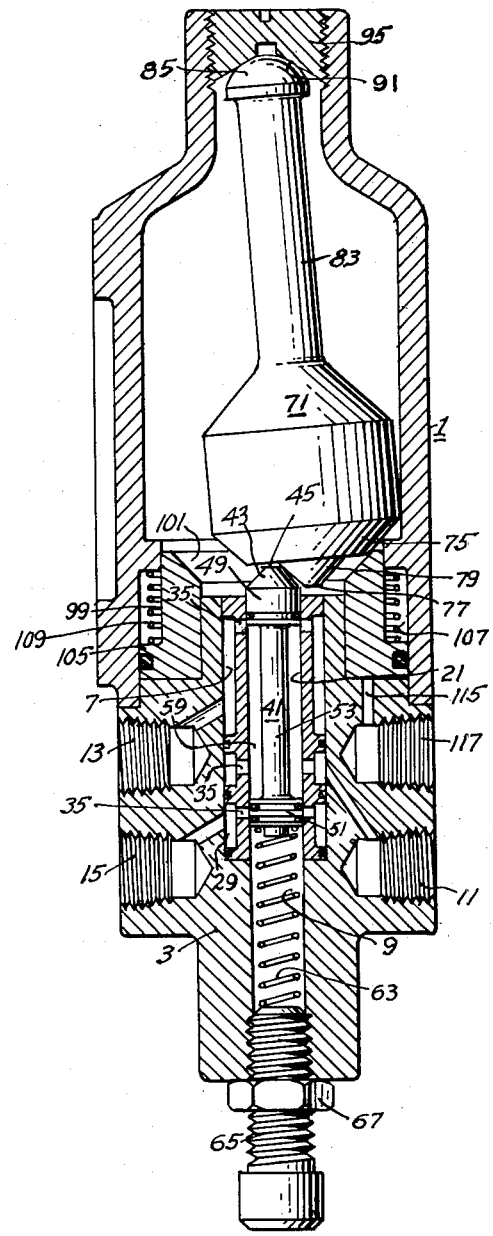
FIG. 2 is a corresponding view depicting the valve assembly of FIG. 1 in its tripped condition.

Referring to the drawings for details of my invention in its preferred form, the same comprises a valve housing 1 including at one end a valve body 3 having one or more flow passages therethrough. In the specific embodiment illustrated, such valve body is in the form of a casting provided with a longitudinal axial passageway including a section 7 of larger diameter and a continuing section 9 of smaller diameter, and connecting with the section of large diameter are a plurality of ports 11, 13, 15 . . . etc., each threaded to receive a pipe or hose fitting. The number of ports is determined by the use to which the valve assembly is to be put, there being three such ports depicted in the embodiment illustrated, one such port 11 constituting an inlet port, while the others may be utilized as discharge ports which may be employed, one to the exclusion of the other or simultaneously, depending on the type of valve incorporated in the assembly. If, in the application of the assembly to a system, a port is not needed, it may be closed by a suitable plug.

Fitted within the passageway section 7 of larger diameter, is a valve sleeve 21. This sleeve is formed with peripheral channels 25, 27, 29 . . . etc., each in communication with one of the ports 11, 13, 15 . . . etc., respectively, while each channel connects by way of a control port 35, with the interior of the sleeve thus forming passageways through the valve body, the sleeve providing a valve seat transversely of each such passageway.

Slidable in the sleeve for cooperation with such valve seats, is a valve 41, having a bevel 43 at its forward end, terminating in an end surface 45 of limited area. In the embodiment illustrated, the valve is formed to provide a forward valve section 49 and a rear valve section 51, the two valve sections being connected by a valve stem 53, the valve sections being so spaced as to close one or the other of the control ports 35 leading to the discharge ports 13, 15, and form a chamber 59 within the sleeve permitting communication between the inlet port 11 and one or the other of the discharge ports, depending on the position of the valve in the sleeve. Thus, movement of the valve may be controlled between a forward position closing the rear control port while exposing the forward control port, and a retracted position closing the forward control port and exposing the rear control port.

Normally urging the valve to its forward position, is a compression spring 63 located in the smaller diameter section 9 of the longitudinal passage and backed up by an adjusting screw 65 provided with a lock nut 67 for holding any adjustment within the adjusting range of the screw. In the absence of other factors, the spring will urge the valve 41 to its forward position.

Adapted however, to hold the valve in its rearward or retracted position against the action of the spring 63, is a holding means 71 in the form of a trip weight so constructed and installed as to be stable under reasonably quiet conditions, but unstable in the presence of substantial vibration, in response to which it is caused to release its hold on the valve and permit the spring to actuate the valve from its retracted position to its forward position.

Such holding means includes a weight 73 having at one end, a bevelled shoulder 75 terminating in a tip of limited contact area 77 bounded by a cam surface 79, and at its other end, the weight is provided with a stem 83 terminating preferably in a substantially spherical end surface 85. The trip weight is disposed in the valve assembly housing with its stem end anchored for universal movement in a complementary socket 91 at that end of the housing opposite the valve body, and with its tip end surface 77 adapted to engage the tapered end surface 45 of the valve, the length of the trip weight being such as to hold the valve in its retracted position against the action of the spring 63 when so engaging the valve.

The complementary socket in the valve housing may be formed in a plug 95 threaded into an opening at that end of the housing, the inner end of the plug being concave to provide the desired socket for the trip weight.

The limited area contact between the trip weight 71 and the tapered end of the valve 41 is sufficient to provide stability under conditions of insignificant or no vibration, but constitutes a condition of instability in the presence of excessive vibration, under which condition, the trip weight will be shaken loose from its contact with the valve and permit the valve to be thrust forward by the spring 63.

The sensitivity of the assembly is a function of the contact area between the trip weight and the valve, as well as the pressure existing between the trip weight and the valve, which pressure may be altered by adjustment of the screw 65. Such sensitivity may be further altered by recessing one of the engaging ends and shaping the opposing end to fit into the recess. The two engaging ends may be complementary, or not complementary so as to effect a substantially line contact within the recessed end.

The cam surface 79 of the tip and the bevel 43 of the valve, permit resetting of the trip weight to its holding position, and means is included in the assembly for swinging the trip weight on its stem end to such holding position which represents an intermediate position of the trip weight. Toward this end, the valve body 3 at its inner end, is of reduced diameter to slidably receive a piston collar 99 with its axis in line with the axis of the trip weight 71 when in its holding position, said piston collar having an inwardly beveled edge 101 facing the beveled shoulder 75 of the trip weight and adapted to be urged against said trip weight to force the same into axial alignment therewith, and bring its tip into surface to surface contact with the tapered end of the valve, against the action of the valve spring 63. The piston collar at its opposite end is provided with a flange 105 slidably sealed against a recessed portion of the housing 1 to form a chamber 107 for a compression spring 109 which normally urges the piston collar to a retracted position.

From such retracted position, the piston collar is adapted to be pneumatically or hydraulically urged against the trip weight by providing the passageway 115 in the valve body leading from the flanged end of the piston collar to a threaded port 117 adapted to receive a pipe or hose connection from a suitable source of pressure.

While all ports 11, 13, 15 . . . etc., have been shown in a common plane, in a practical embodiment, such ports will be spaced circumferentially from one another.

The valve assembly may be bolted directly to an engine or other piece of apparatus to be protected against excessive vibration, or the valve assembly may be mounted on a flexible bracket affixed to such engine or apparatus whereby to mechanically amplify vibrations transmitted to the trip weight. In affixing the same to the engine or apparatus to be protected, the valve assembly is preferably mounted horizontally, in which position it is most sensitive to vibration, though it will function in other positions, it being appreciated that the sensitivity of the valve assembly will vary with its manner and position of mounting.

By maintaining resetting pressure against the piston collar, the trip weight may be restrained against tripping, and this could come in handy as when starting up an engine or other apparatus, where vibration during starting could become excessive.

Generally speaking therefore, the device of the present invention provides a trip weight fulcrumed at one end to permit angular swing in more than one plane and is restrained against movement from an intermediate position in the absence of excessive vibration, though permitted to move from such position in response to vibration above a level determined by the restraining means, to exercise a control function.

From the foregoing description of my invention, it will be apparent that the same is subject to alteration and modification without departing from the underlying principles involved, and I accordingly do not desire to be limited in my protection to the specific details illustrated and described except as may be necessitated by the appended claims.

I claim:

1. A vibration responsive device comprising a housing, a trip weight in said housing having one end fulcrumed therein to permit angular swing in more than one plane, means for restraining said weight against movement from an intermediate position in the absence of excessive vibration and permitting such movement in response to vibration above a level determined by the degree of restraint exercised by said restraining means, means responsive to such movement of said weight for exercising a control function, means for adjusting within a substantial range, the degree of restraint imposed by said restraining means, and means for restoring said trip weight to its said intermediate position for any mounted position of said vibration responsive device between a vertical and a horizontal position.

2. A vibration responsive trip valve assembly comprising a valve assembly housing having a passageway therethrough; a valve seat in said housing transversely of said passageway; a valve having a tapered end of limited contact area, said valve being adapted in one position to close said passageway at said valve seat and in another position adapted to open said passageway at said valve seat; resilient pressure means normally urging said valve to one of said positions; and means for holding said valve to its other position in opposition to the pressure of said resilient pressure means and in the absence of vibration, and adapted, when exposed to vibration, to be displaced from its holding position and permit said resilient pressure means to actuate said valve to said first position, and means within said housing and actuable from without said housing, for resetting said holding means to said holding position following displacement thereof from said position in response to vibration.

3. A vibration responsive trip valve assembly comprising a valve assembly housing having a passageway therethrough; a valve seat in said housing transversely of said passageway; a valve having a tapered end of limited contact area, said valve being adapted in one position to close said passageway at said valve seat and in another position adapted to open said passageway at said valve seat; resilient pressure means normally urging said valve to one of said positions; means for holding said valve to its other position in opposition to the pressure of said resilient pressure means in the absence of vibration and adapted, when exposed to vibration, to be displaced from its holding position and permit said resilient pressure means to actuate said valve to said first position, said holding means including a weight having at one end, a beveled shoulder terminating in a tip of limited contact area bounded by a cam surface, and at its other end, a stem, said trip weight being disposed in said valve assembly housing with its stem end anchored for universal movement in a complementary socket at one end of said housing and with its tip end adapted to engage the tapered end of said valve in said other position of said valve and hold it in said other position against the pressure of said resilient pressure means, and means utilizing said cam surface for resetting said holding means to said holding position following displacement thereof from said position in response to vibration.

4. A vibration responsive trip valve assembly comprising a valve assembly housing having a passageway therethrough; a valve seat in said housing transversely of said passageway; a valve having a tapered end of limited contact area, said valve being adapted in one position to close said passageway at said valve seat and in another position adapted to open said passageway at said valve seat; resilient pressure means normally urging said valve to one of said positions; means for holding said valve to its other position in opposition to the pressure of said resilient pressure means and in the absence of vibration, and adapted, when exposed to vibration, to be displaced from its holding position and permit said resilient pressure means to actuate said valve to said first position, and means within said housing and actuable from without said housing, for resetting said holding means to said holding position following displacement thereof from said position in response to vibration.

5. A vibration responsive trip valve assembly comprising valve assembly housing having a passageway therethrough; a valve seat in said housing transversely of said passageway; a valve having a tapered end of limited contact area, said valve being adapted in one position to close said passageway at said valve seat and in another position adapted to open said passageway at said valve seat; resilient pressure means normally urging said valve to one of said positions; means for holding said valve to its other position in opposition to the pressure of said resilient pressure means and in the absence of vibration, and adapted, when exposed to vibration, to be displaced from its holding position and permit said resilient pressure means to actuate said valve to said first position, said holding means including a weight having at one end, a beveled shoulder terminating in a tip of limited contact area bounded by a cam surface, and at its other end, a stem terminating in a substantially spherical end surface, said holding means being disposed in said valve assembly housing with its stem end anchored for universal movement in a complementary socket at one end of said housing and with its tip end adapted to engage the tapered end of said valve in said other position of said valve and hold it in said other position against the pressure of said resilient pressure means; and means for resetting said holding means to said holding position following displacement thereof from said position in response to vibration, said resetting means including a piston collar slidably supported in said housing with its axis in line with the axis of said holding means when in its holding position, said piston collar having an inwardly beveled end facing the beveled shoulder of said holding means and adapted when urged against said holding means to force the same into axial alignment therewith and bring its tip into pressure holding engagement with the tapered end of said valve, spring means normally holding said piston collar in a retracted position, and means for applying pressure to said piston collar to drive the same against said holding means to align the same and restore said holding means to its holding position.

References Cited in the file of this patent

UNITED STATES PATENTS

| | | |
|---|---|---|
| 941,033 | Pardee | Nov. 23, 1909 |
| 2,637,273 | Stokes | May 5, 1953 |
| 2,910,080 | Wright | Oct. 27, 1959 |
| 3,043,321 | Hewitt | July 10, 1962 |

FOREIGN PATENTS

| | | |
|---|---|---|
| 1,187,122 | France | Mar. 2, 1959 |